(12) United States Patent
Meeussen et al.

(10) Patent No.: US 12,133,488 B2
(45) Date of Patent: Nov. 5, 2024

(54) LOW FLOW PLUMBING SYSTEM

(71) Applicant: Hippo Harvest Inc., San Francisco, CA (US)

(72) Inventors: Wim Meeussen, Redwood City, CA (US); Eitan Marder-Eppstein, San Francisco, CA (US); Alexander Boenig, San Mateo, CA (US)

(73) Assignee: HIPPO HARVEST INC., San Francisco, CA (US)

( * ) Notice: Subject to any disclaimer, the term of this patent is extended or adjusted under 35 U.S.C. 154(b) by 329 days.

(21) Appl. No.: 17/182,216

(22) Filed: Feb. 22, 2021

(65) Prior Publication Data

US 2021/0259172 A1     Aug. 26, 2021

Related U.S. Application Data

(60) Provisional application No. 62/979,364, filed on Feb. 20, 2020.

(51) Int. Cl.
*A01G 31/00* (2018.01)
*A01G 7/02* (2006.01)
(Continued)

(52) U.S. Cl.
CPC .............. *A01G 31/02* (2013.01); *A01G 7/02* (2013.01); *A01G 7/045* (2013.01); *A01G 9/0299* (2018.02); *A01G 9/247* (2013.01); *A01G 9/26* (2013.01); *A01G 25/09* (2013.01); *A01G 25/16* (2013.01); *A01G 27/00* (2013.01); *A01G 27/001* (2013.01); *A01G 27/003* (2013.01);
(Continued)

(58) Field of Classification Search
CPC . A01G 9/24; A01G 9/247; A01G 9/26; A01G 31/00; A01G 31/02; A01G 31/04; A01G 31/06; A01G 9/02; A01G 9/023; A01G 9/16
See application file for complete search history.

(56) References Cited

U.S. PATENT DOCUMENTS 11,457,578 B2   10/2022  Marder-Eppstein et al.
2018/0365137 A1  12/2018  Millar
(Continued)

FOREIGN PATENT DOCUMENTS

CN   108496654 A   9/2018
CN   110679340 A   1/2020
(Continued)

OTHER PUBLICATIONS

U.S. Appl. No. 17/182,222, Non-Final Office Action mailed May 10, 2021, 8 pgs.
(Continued)

*Primary Examiner* — Joshua J Michener
*Assistant Examiner* — Henry Hooper Mudd

(57) ABSTRACT

A plumbing system and water transport method. The system includes a global water source, a one way water transport mechanism, a growing tray, and a local buffer. The local buffer separates the global water source and the growing tray to prevent cross-contamination of water. The local buffer also continuously provides water to the growing tray on demand without the need for filtering or dumping of used or excess water. This results in low flow, efficient water transport.

20 Claims, 11 Drawing Sheets

(51) Int. Cl.

| | | |
|---|---|---|
| A01G 7/04 | (2006.01) | |
| A01G 9/029 | (2018.01) | |
| A01G 9/24 | (2006.01) | |
| A01G 9/26 | (2006.01) | |
| A01G 25/09 | (2006.01) | |
| A01G 25/16 | (2006.01) | |
| A01G 27/00 | (2006.01) | |
| A01G 31/02 | (2006.01) | |
| A01M 7/00 | (2006.01) | |
| B25J 11/00 | (2006.01) | |
| B60P 3/30 | (2006.01) | |
| F24F 11/00 | (2018.01) | |
| G05B 19/042 | (2006.01) | |
| G05D 1/00 | (2006.01) | |
| G06F 16/25 | (2019.01) | |
| G06Q 10/0631 | (2023.01) | |
| G06Q 50/02 | (2012.01) | |

(52) U.S. Cl.
CPC ......... *A01G 27/008* (2013.01); *A01M 7/0089* (2013.01); *B25J 11/00* (2013.01); *B60P 3/30* (2013.01); *F24F 11/00* (2013.01); *G05B 19/042* (2013.01); *G05D 1/0214* (2013.01); *G06F 16/25* (2019.01); *G06Q 10/06315* (2013.01); *G06Q 50/02* (2013.01); *A01G 9/24* (2013.01); *A01M 7/0025* (2013.01); *G05B 2219/23133* (2013.01)

(56) References Cited

U.S. PATENT DOCUMENTS

| | | | |
|---|---|---|---|
| 2018/0368344 A1 | 12/2018 | Marshall | |
| 2019/0261566 A1 | 8/2019 | Robertson et al. | |
| 2019/0281778 A1 | 9/2019 | Hawley-Weld et al. | |
| 2020/0236878 A1* | 7/2020 | Millar | A01G 27/00 |
| 2021/0007307 A1* | 1/2021 | Adams | A01G 31/06 |
| 2021/0084845 A1* | 3/2021 | Hunter | A01G 27/00 |
| 2021/0137028 A1 | 5/2021 | Zelkind et al. | |
| 2021/0259160 A1 | 8/2021 | Marder-Eppstein et al. | |
| 2023/0028722 A1 | 1/2023 | Marder-Eppstein et al. | |
| 2023/0082515 A1* | 3/2023 | Schoen | A01G 31/06 |

FOREIGN PATENT DOCUMENTS

| | | |
|---|---|---|
| EP | 3476211 A2 | 5/2019 |
| EP | 217563980 | 8/2022 |
| WO | 2014066844 A2 | 5/2014 |
| WO | 2018172490 A1 | 9/2018 |
| WO | 2019074549 A1 | 4/2019 |
| WO | 2019222860 A1 | 11/2019 |
| WO | WO2021168459 | 2/2021 |
| WO | 2021168459 A1 | 8/2021 |

OTHER PUBLICATIONS

U.S. Appl. No. 17/182,222, Examiner Interview Summary mailed Jun. 24, 2021, 2 pgs.
Int'l Application Serial No. PCT/US21/19130, Int'l Search Report and Written Opinion mailed Jun. 9, 2021.
U.S. Appl. No. 17/938,032, USPTO e-Office Action: CTFR—Final Rejection, Jul. 31, 2023, 8 pages.
U.S. Appl. No. 17/938,032, USPTO e-Office Action: CTNF—Non-Final Rejection, Jan. 18, 2023, 4 pages.
U.S. Appl. No. 17/182,222, Advisory Action mailed Oct. 22, 2021, 3 pgs.
U.S. Appl. No. 17/182,222, Examiner Interview Summary mailed Feb. 2, 2022, 2 pgs.
U.S. Appl. No. 17/182,222, Final Office Action mailed, Sep. 14, 2021, 8 pgs.
U.S. Appl. No. 17/182,222, Non-Final Office Action mailed Jan. 5, 2022, 8 pgs.
U.S. Appl. No. 17/182,222, Notice of Allowance mailed Jun. 2, 2022, 5 pgs.
Extended European Search Report mailed Jul. 12, 2023, EP Application No. 21756398.0, 12 pages.

* cited by examiner

LOW FLOW PLUMBING SYSTEM

CROSS-REFERENCE TO RELATED APPLICATIONS

This application claims priority to Provisional U.S. Patent Application No. 62/979,364, titled "Growspace Operating System," filed on Feb. 20, 2020, by Eitan Marder-Eppstein et al., which is incorporated herein by reference in its entirety and for all purposes.

TECHNICAL FIELD

The present disclosure relates generally to plumbing systems, and more specifically to low flow plumbing systems.

DESCRIPTION OF RELATED ART

Agriculture has been a staple for mankind, dating back to as early as 10,000 B.C. Through the centuries, farming has slowly but steadily evolved to become more efficient. Traditionally, farming occurred outdoors in soil. However, such traditional farming required vast amounts of space and results were often heavily dependent upon weather. With the introduction of greenhouses, crops became somewhat shielded from the outside elements, but crops grown in the ground still required a vast amount of space. In addition, ground farming required farmers to traverse the vast amount of space in order to provide care to all the crops. Further, when growing in soil, a farmer needs to be very experienced to know exactly how much water to feed the plant. Too much and the plant will be unable to access oxygen: too little and the plant will lose the ability to transport nutrients, which are typically moved into the roots while in solution.

Two of the most common errors when growing are overwatering and underwatering. With the introduction of hydroponics, the two most common errors are eliminated. Hydroponics prevents underwatering from occurring by making large amounts of water available to the plant. Hydroponics prevents overwatering by draining away, recirculating, or actively aerating any unused water, thus, eliminating anoxic conditions. However, the large amounts of water in combination with the draining produces an extremely inefficient watering system.

In today's climate, reducing the amount of water needed to operate a grow system is better for the environment, more cost effective, and overall more efficient. Thus, there is a need for a low flow plumbing system that efficiently delivers water to hydroponic grow systems.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure relates to a plumbing system. The system comprises a global water source, a one way water transport mechanism, a growing tray, and a local buffer. The local buffer is configured to create a local water source to be used by the growing tray. The local water source is decoupled from the global water source such that cross-contamination of water from the local water source and the global water source is prevented. The local buffer is further configured to continuously provide water to the growing tray on demand without the need for filtering or dumping of used or excess water.

Another aspect of the present disclosure relates to method for transporting water. The method comprises delivering water via a plumbing system. The system comprises a global water source, a one way water transport mechanism, a growing tray, and a local buffer. The local buffer is configured to create a local water source to be used by the growing tray. The local water source is decoupled from the global water source such that cross-contamination of water from the local water source and the global water source is prevented. The local buffer is further configured to continuously provide water to the growing tray on demand without the need for filtering or dumping of used or excess water.

In some embodiments, the global water source includes a plurality of nutrient reservoirs, each nutrient reservoir capable of holding nutrient water with a unique composition. In some embodiments, the global water source includes a fertigation system that creates nutrient mixes with a desired nutrient composition on demand. In some embodiments, the growing tray includes a growing tray plumbing connection that can connect and disconnect with a corresponding dock without manual intervention or wasting water. In some embodiments, the one way water transport mechanism includes a robot instead of plumbing pipes for transporting water from the global water source to the local water source. In some embodiments, the growing tray is completely self-contained with no drain, the growing tray configured to receive water via robotic transport. In some embodiments, a circulation controller controls a dock circulation pump to deliver water to the growing tray via short bursts of large flows of water to prevent clogging. In some embodiments, the growing tray includes an inflow channel and an outflow channel both configured to be light-blocking in order to remove light from areas in plumbing connections where water sits for any prolonged period of time. In some embodiments, a circulation controller controls a dock circulation pump to turn the circulation pump on or off. In some embodiments, the global water source, one way water transport mechanism, and local buffer are configured such that water is delivered via gravity flow even in the event of a power loss.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
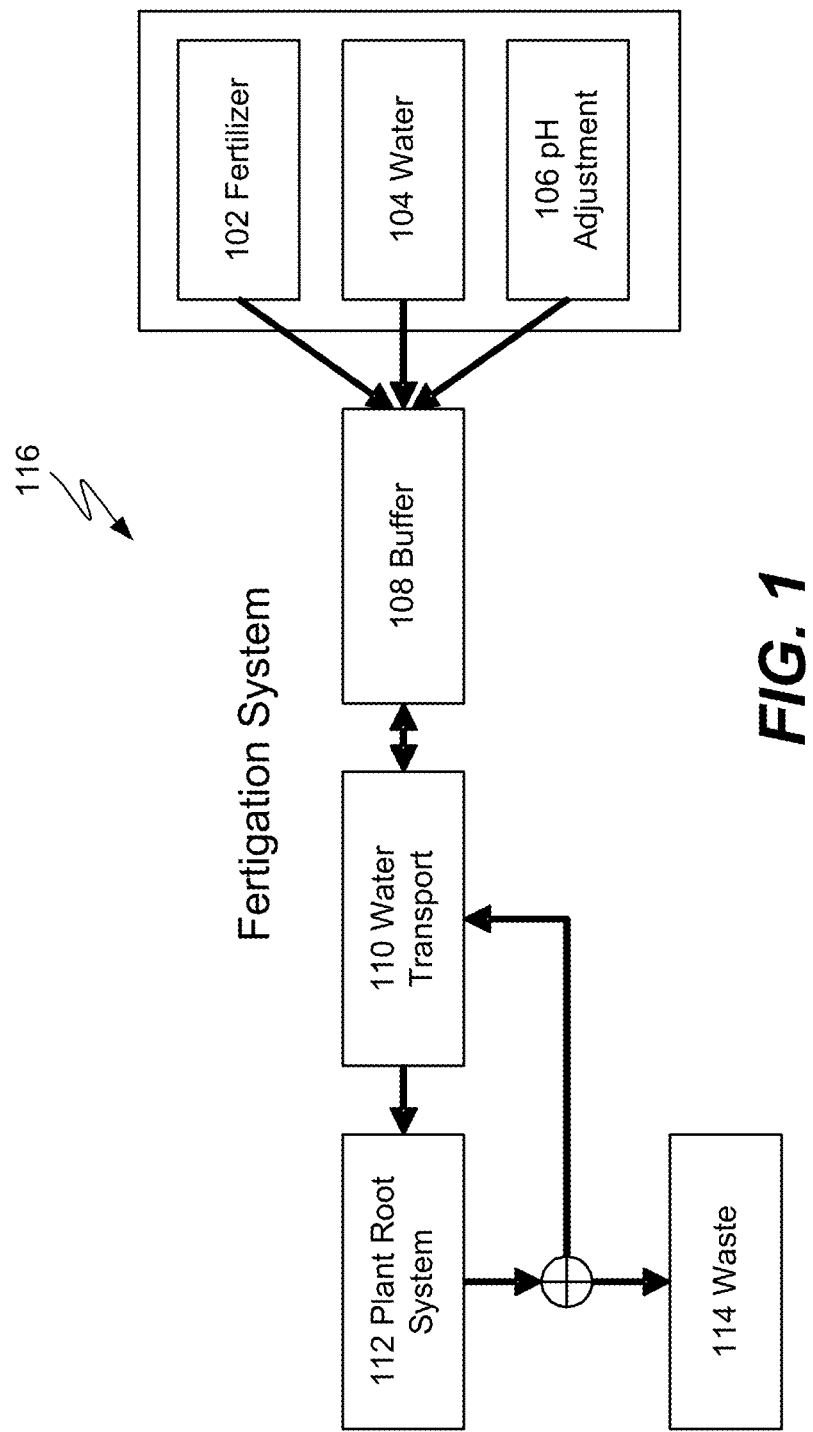
FIG. 1 illustrates a simple diagram showing one example of a typical plumbing system for hydroponic farms, in accordance with embodiments of the present disclosure.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, portions of the techniques of the present disclosure will be described in the context of particular computerized systems. However, it should be noted that the techniques of the present disclosure apply to a wide variety of different computerized systems. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Example Embodiments

As mentioned above, current hydroponic systems have many draw backs. For example, current hydroponic grow methods rely on plumbing systems that are high flow, which prohibit building modular growing components because connecting and disconnecting a grow system from a high flow plumbing system can be challenging. In addition, some high flow modular grow unit contains a large volume of water which makes transport difficult. These high flow systems therefore place limits on the type and flexibility of automation that can be performed in current growspaces where plants are assumed to be stationary. In some embodiments, the low flow plumbing system disclosed herein allows for plants of many different varietals to be moved in and out of plumbing, which, in turn, allows them to be transported to a central location for processing. In such embodiments, processing plants centrally allows for more efficient labor and automation as compared to operations where all labor/harvesting must be performed in-field.

In addition, current hydroponic methods also see the nutrient composition in their main water reservoirs change over time as nutrients are taken up serially by plants and water re-circulates throughout the whole farm at high flow rates. In some embodiments, the low flow plumbing system disclosed herein provides strong guarantees on one-directional water flow that prevents the nutrient composition of the main reservoirs from changing as it is guaranteed there is no backflow to them. This would not be possible with higher flow rates as the volume of water required in the main system would be immense.

Another common error in farming is supplying plants with sub-optimal nutrients for growth. Hydroponics improves this by allowing growers to select the exact water-to-nutrient mix they would like to provide to their plants. However, current systems require moving high volumes of water which in turn requires robust and often costly plumbing solutions. This leaves these systems limited in their ability to provide nutrients to plants within a growspace in a targeted fashion without cost becoming prohibitive. Reducing water flow requirements leads to more cost effective and flexible systems that can deliver custom nutrient mixes to a small subset of plants within a growspace.

While hydroponic systems have many benefits, one weakness is to water borne disease. As today's systems often recirculate water across wide areas of a growspace, if a pathogen enters the water supply, it can quickly infect plants throughout the entire plumbing run. Reducing the volume of water that must flow through a hydroponic system also makes it possible to route water through a growspace in a one-way fashion where small areas of the growspace are completely isolated from each other in terms of water supply. This isolation reduces the risk of water borne disease in a growspace as any pathogen can only impact a small area of the growspace as there is no recirculating path for it to exploit.

According to various embodiments, the low flow plumbing techniques and mechanisms presented herein solves a number of problems that exist in current forms of hydroponic crop production.

FIG. 1 describes a typical plumbing system for hydroponic farms where fertilizer 102, water 104, and pH adjustment 106 are combined via a fertigation system 116 to make nutrient water which is stored in a buffer 108 and sent to plant root system 112 via water transport 110. Nutrient water that is not immediately taken up by plants is then either disposed of as waste 114 or returned to buffer 108 via water transport 110. Scaled versions of such systems deployed throughout the hydroponic industry require that water transport 110 be able to accommodate large flows/volumes of water and are most commonly built with large volume pipes that offer little flexibility and are costly to install and maintain. Furthermore, these systems require continuous filtration and/or dumping of nutrient water in their water transport system to avoid salt build up that occurs over time. Some systems do avoid dumping by allowing water to runoff from the system, though for the purposes of this disclosure, that is considered a form of dumping.

Figure 2:
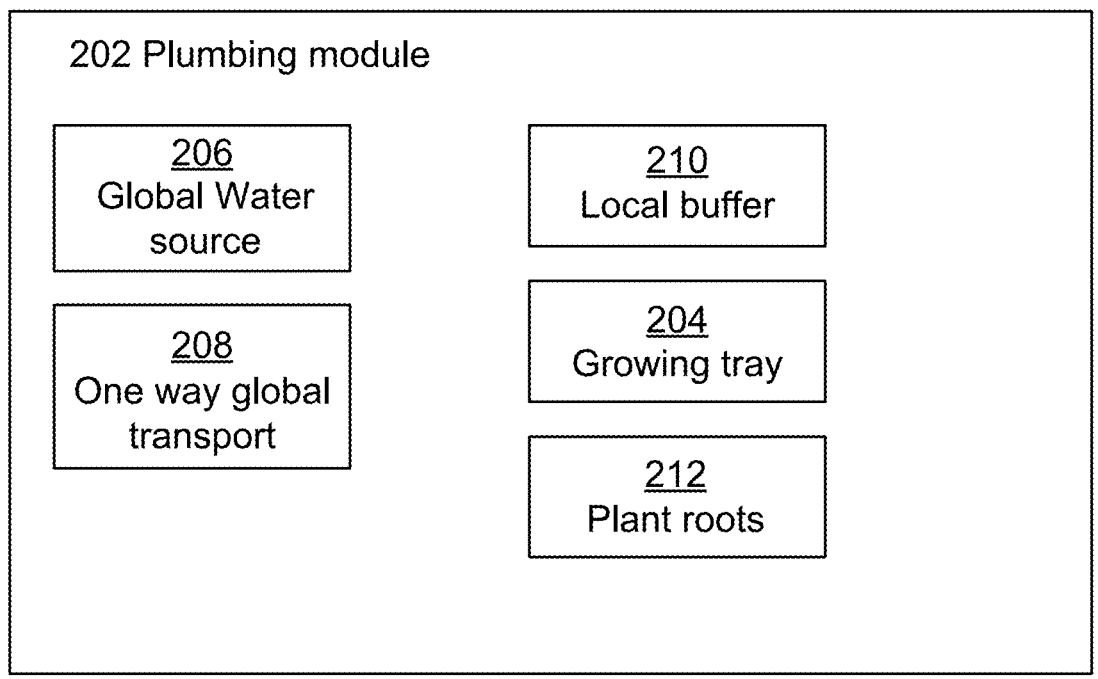
FIG. 2 illustrates a block diagram showing one example of a plumbing module, in accordance with embodiments of the present disclosure.

FIG. 2 describes a plumbing module 202 that allows for cheaper, more flexible, infrastructure as it reduces the volume of water that must be moved at any given time through a growspace. In some embodiments, this system replaces growspace wide transport of nutrient water with a two tiered approach, relying on low flow global transport coupled with local buffering. In the system, global water source 206 sends nutrient water to a local buffer 210 for use in one or more growing trays 204 located throughout the growspace. Local buffer 210 provides water to plant roots 212 which take up some nutrient water and leave the rest in local buffer 210.

In some embodiments, decoupling global transport 208 from local buffering 210 in this way allows for nutrient water to be provided to plant roots 212 independent of global flow rates and is the mechanism by which low flow requirements are achieved and also isolates global water source 206 from any contamination from local buffers 210, thereby removing the need to filter or dump water as in conventional systems. According to various embodiments, global transport 208 need only provide nutrient water to local buffer 210 or to a select number of growing trays 204 at a time, meaning global transport 208 can be sized based on the flow requirements of a single or small group of growing trays 204 and not the entire growspace.

Figure 3:
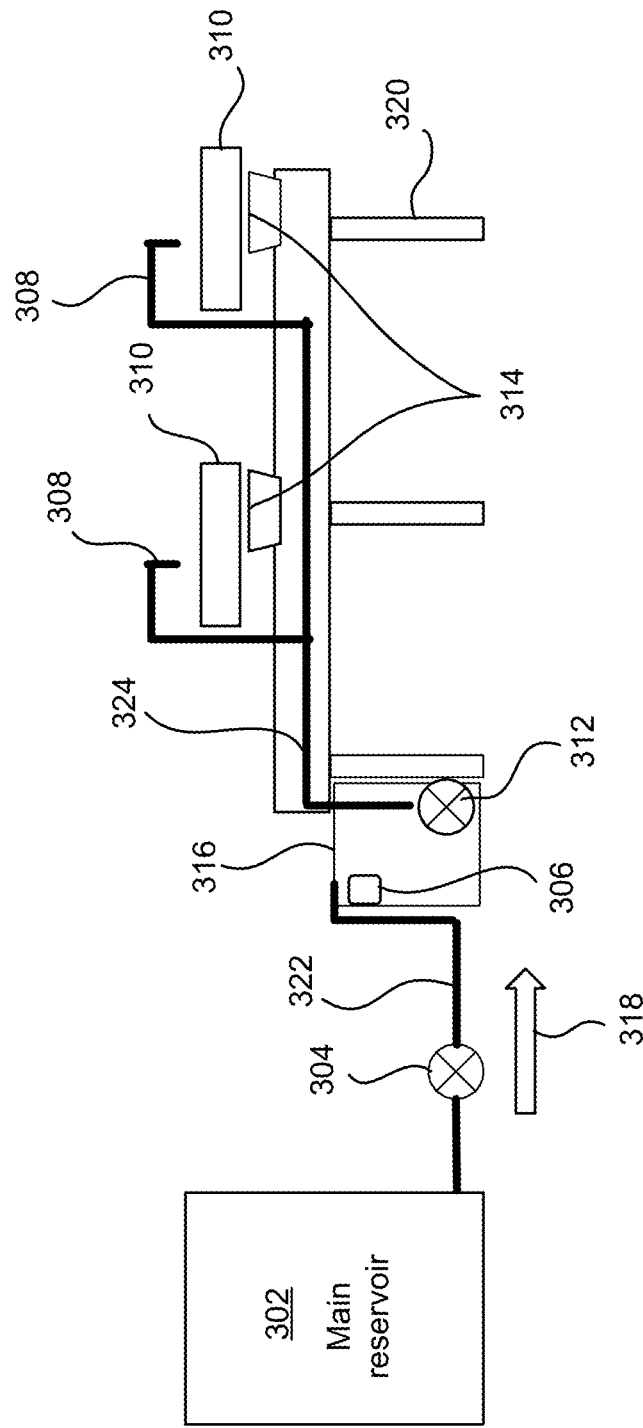
FIG. 3 illustrates an example of a plumbing system, in accordance with embodiments of the present disclosure.

A specific implementation of this system is shown in FIG. 3. In FIG. 3, main reservoir 302 moves nutrient water to a group of growing trays located at a single dock 320. Nutrient water flows to a dock reservoir 316 via a supply pump 304 and global plumbing 322 when requested by a float valve 306 which monitors local water levels. From there, dock circulation pump 312 sends nutrient water through local plumbing 324 to drippers 308 that feed into growing trays 310, which hold plants. Some nutrient water is taken up by the plants and the rest flows out of growing trays 310 through drains 314 that lead back to local plumbing 324 where the water returns to dock reservoir 316 for recirculation.

The low flow requirements of this system allow for cheap, low power, pumps to be used for supply pumps 304 and dock circulation pumps 312. It also allows for inexpensive irrigation tubing to be used for both global plumbing 322 and local plumbing 324, reducing cost and complexity relative to traditional systems. Finally, this system guarantees a one way flow direction 318 between the main reservoirs 302 and dock reservoirs 316 which simplifies global plumbing 322 further as there is no need for water to return to the main reservoir 302 once it is sent out. Together, these changes represent significant improvements relative to typical hydroponic systems in cost and complexity of deployment.

Hydroponic plumbing systems today are limited in their ability to deliver nutrients to plants in a targeted fashion. With current systems, every plant on a given plumbing run, often sized to the entire growspace, will receive the same composition of nutrients. In practice, this means that growers are unable to deliver nutrients optimally to plants based on their stage of life, subspecies, or species (e.g. lettuce vs tomatoes). They are forced instead to pick nutrient compositions that strike a balance between all the plants in their growspace impacting the performance of their systems. However, not having these restrictions would be extremely advantageous to growers looking to gain advantages in growth. Changing nutrient compositions based on stage of life can lead to a more optimal formulation for a plant based on that specific stage. Changing compositions based on subspecies can allow for multiple types of a crop to be grown optimally in parallel in one growspace. Changing composition based on species type can even allow for crops like lettuce and tomatoes, which require drastically different nutrient mixes, to be grown in parallel.

Figure 4:
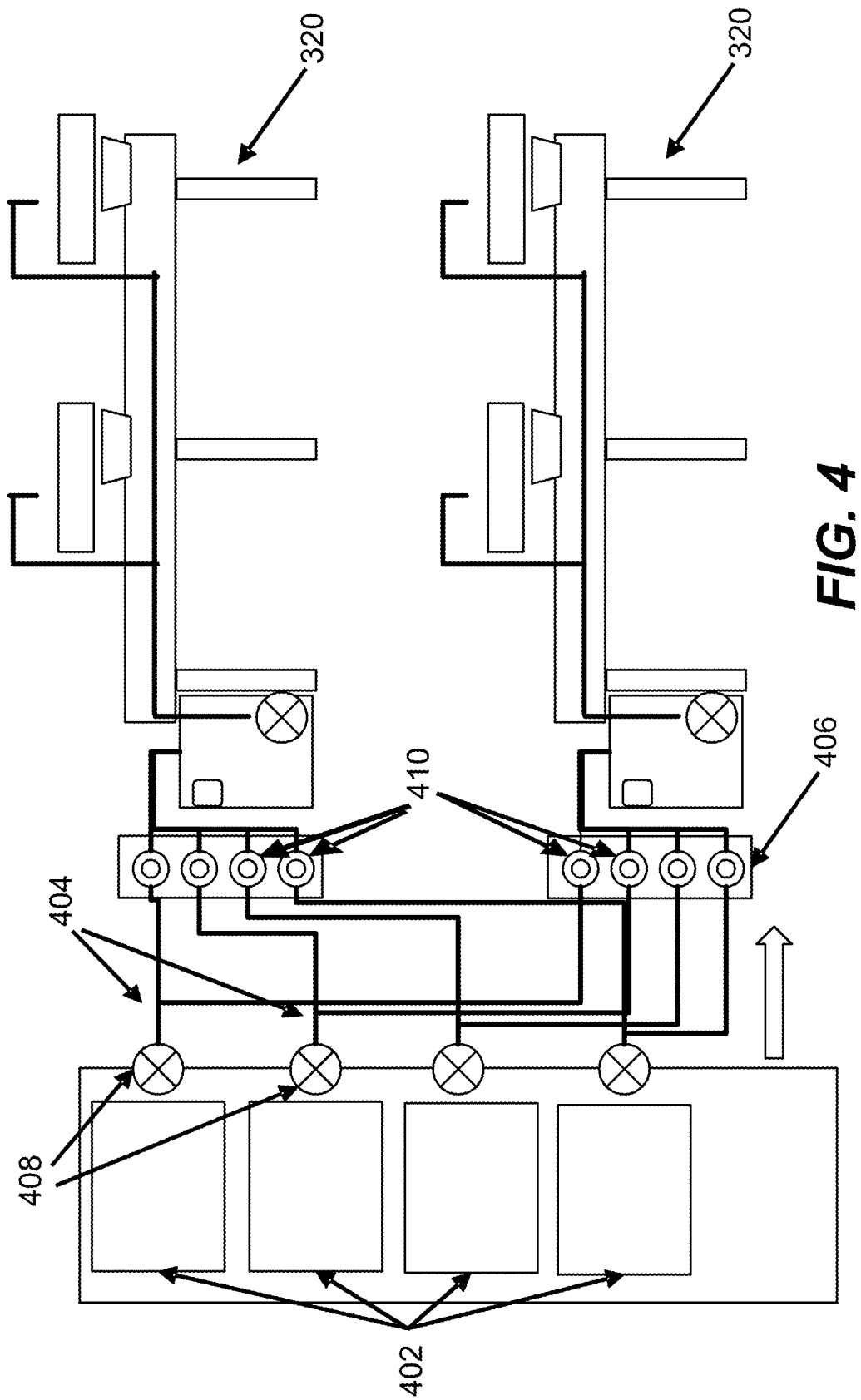
FIG. 4 illustrates an example of a plumbing system with multiple nutrient reservoirs, in accordance with embodiments of the present disclosure.

FIG. 4 presents a system configuration that replaces a single main reservoir 302 with multiple nutrient reservoirs 402, each capable of holding nutrient water with a unique composition. Nutrient pumps 408 send nutrient water from each nutrient reservoir 402 through a dedicated nutrient plumbing line 404. Dock nutrient selector 406 is then used to select which nutrient water to take into a given dock 320, which follows the same local recirculation pathway outlined in FIG. 3 above. Dock nutrient selector 406 is composed of solenoid valves 410 for each plumbing line run that is controlled by a computer remotely to allow water flow into dock 320 from a selected nutrient plumbing 404 line. Each solenoid valve uses electro-magnetism to open or close based on the current that it receives. This means that they can be electrically controlled via a computer. This configuration allows each dock 320 to select between a predetermined number of nutrient solutions based on stage of growth, plant subspecies, or other factors, as the cost of running additional nutrient plumbing lines is relatively low given the low flow requirements of transport to the docks.

The example system presented in FIG. 4 above limits the number of different nutrient water compositions that can be distributed at one time to the number of nutrient reservoirs in the system and also requires a solenoid valve be present at each dock 320 for each unique nutrient mix supplied to the system. This is sufficient to cover a wide range of nutrient requirements, but for growspaces that require even more flexibility it is desirable to create nutrient mixes on demand. It may also be desirable to reduce the cost and complexity of the system by reducing the number of solenoid valves required in construction.

Figure 5:
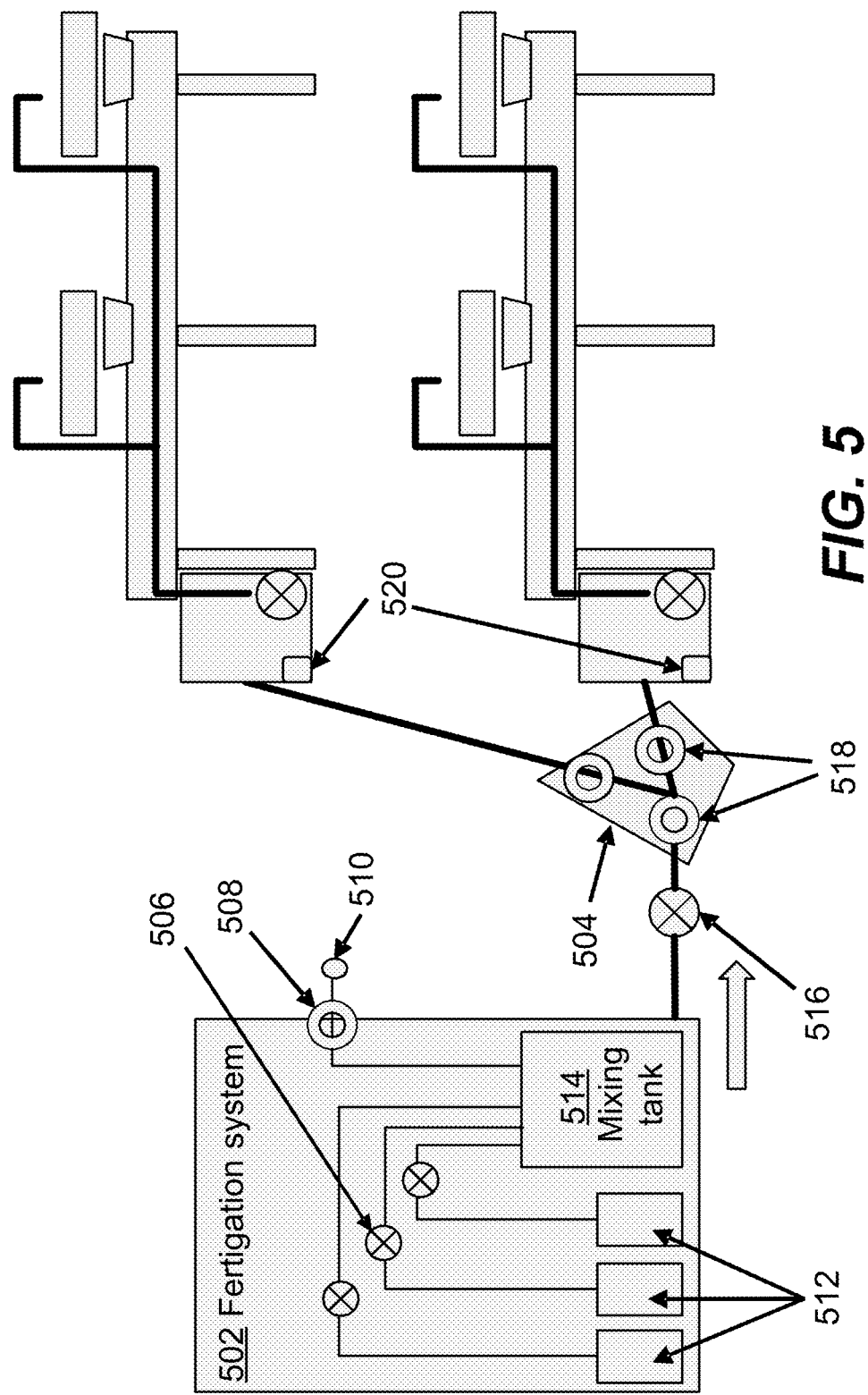
FIG. 5 illustrates an example of a plumbing system with fertigation, in accordance with embodiments of the present disclosure.

The example system configuration shown in FIG. 5 replaces the main reservoir 302 with a fertigation system 502 that creates nutrient mixes with a desired nutrient composition on demand for use in a growspace. Fertigation system 502 selects nutrients from a number of concentrate tanks 512 that are combined in desired proportions with water. Water enters the system via an external water supply 510 (e.g. municipal water) and a computer controls the amount that enters a mixing tank 514 via a water solenoid valve 508. From there, computer controlled concentrate pumps 506 pull a desired amount of concentrate from the concentrate tanks into the mixing tank to create nutrient water that can be sent to the plants.

According to various embodiments, nutrient water creation is triggered by water level sensors 520 that are placed at each dock and determine when a batch of nutrient water is required. When a water level sensor 520 for a dock 320 shows as low, a mix is created by the fertigation system and delivery pump 516 immediately moves nutrient water to dock reservoir 316 of the dock, selected by dock selector 504, with the water level sensor 520 that triggered the refill. In some embodiments, dock selector 504 comprises a dock solenoid valve 518 per each dock that can be computer controlled. In some embodiments, this configuration eliminates the need for main reservoirs 302 or nutrient reservoirs 402 while also providing the flexibility to create custom nutrient mixes for delivery to a dock 320 at any time. Furthermore, it reduces the solenoid valves requirement to just one per dock, plus one for the incoming water supply as opposed to having a solenoid for each dock multiplied by the number of nutrient mixes presented in FIG. 4. In some embodiments, the system in FIG. 5 presents a cheaper, more flexible, and more scalable system than that in FIG. 4.

The example systems presented above reduce complexity and cost of growspace plumbing relative to hydroponic operations today. However, there are still challenges in deployment as pipes must still be routed over large spaces. This problem is compounded for configurations that achieve targeted nutrient delivery where a new plumbing line is required for each nutrient composition sent through the growspace, or on-demand nutrient delivery where some nutrient water may remain in the main plumbing lines over long runs.

Figure 6:
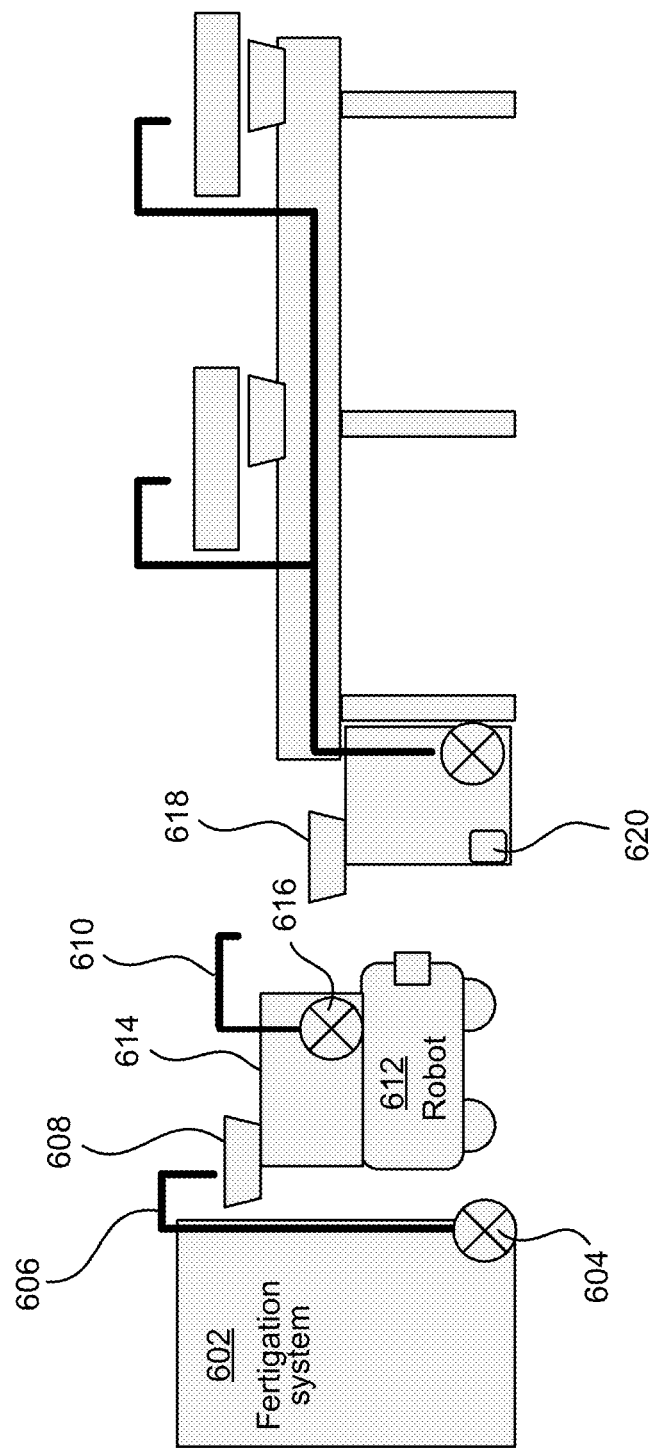
FIG. 6 illustrates an example of a plumbing system with robotic transport, in accordance with embodiments of the present disclosure.

Fortunately, the low flow requirements of the systems presented herein allow for novel configurations that avoid growspace wide plumbing altogether. Such a configuration is outlined in FIG. 6, where a robot 612 is responsible for transporting nutrient water. In FIG. 6, a fertigation system 602 creates nutrient water with a desired composition on demand and triggered by a low water level sensor 620, e.g., via wireless connection, placed at a given dock 320. The fertigation system 602 uses a fertigation pump 604 to send nutrient water created for dock 320 whose water level sensor 620 triggered the nutrient water flow through fertigation outflow 606 and into robot inflow 608. The nutrient water goes through robot inflow 608 into robot reservoir 614, at which point robot 612 drives to the location of desired dock 320. Once there, robot pump 616 moves the nutrient water out through the robot outflow 610 and into dock inflow 618. From here, nutrient water lows to dock 320 using a process similar to the process described above with reference to FIG. 3.

According to various embodiments, by using robot 612 as a mechanism to transport nutrient water with no plumbing, the system gains a number of advantages. First, it reduces cost by eliminating the need for growspace wide plumbing completely. Second, it allows for unlimited nutrient mixtures to be created and transported with no additional plumbing runs, reservoirs, cost, or risk of water remaining in main plumbing lines. Third, it reduces system complexity when delivering targeted nutrients, thus avoiding the use of solenoid valves, which must be switched on and off in favor of a simple single-pump based system.

Mobile robots readily available for tasks in the warehouse, logistics, and manufacturing sectors also hold promise for automating hydroponics. However, current hydroponic plumbing systems are not compatible with this kind of transport because they do not provide a ready way for a mobile robot to move plants in and out of plumbing automatically.

Figure 7:
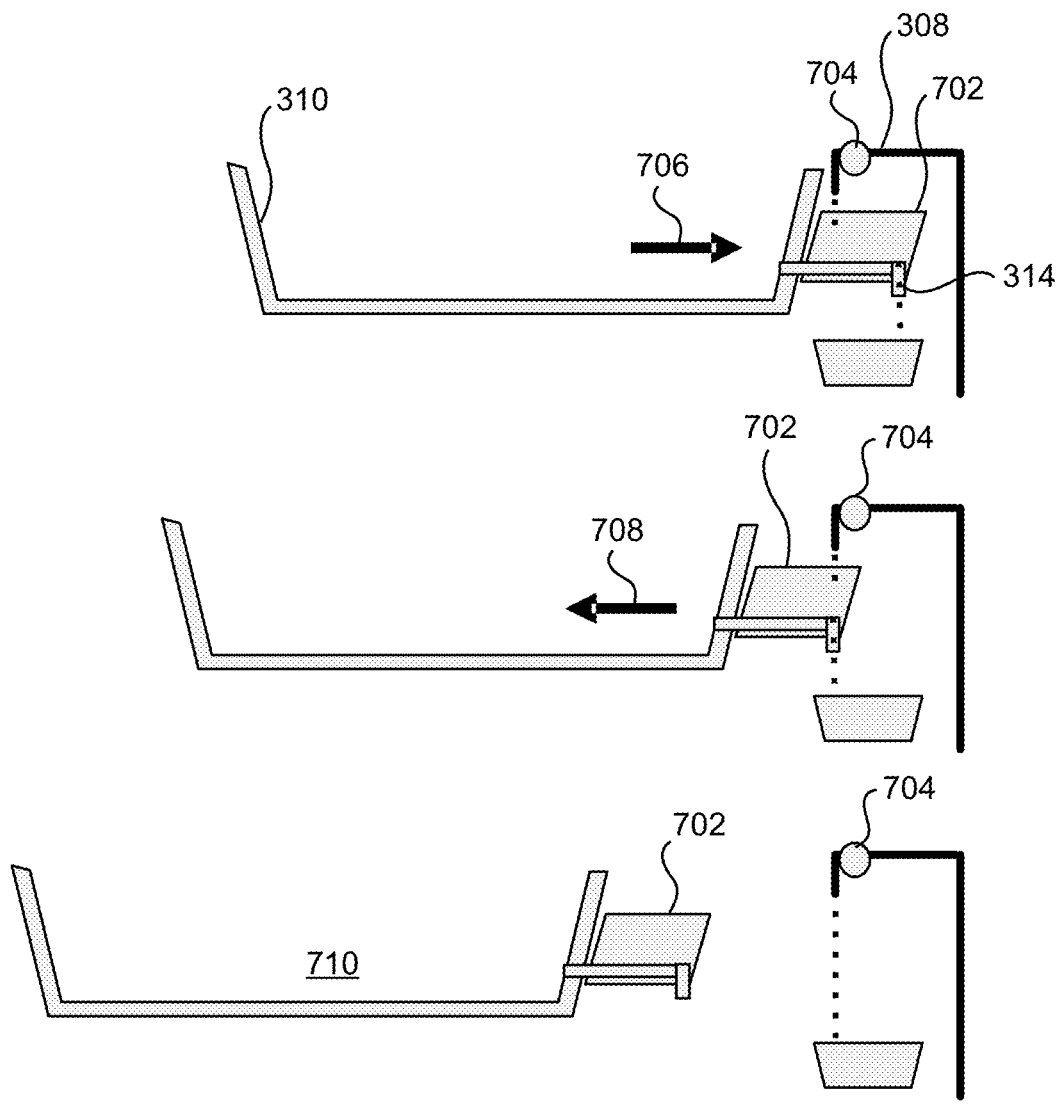
FIG. 7 illustrates a passive plumbing connection, in accordance with embodiments of the present disclosure.

FIG. 7 illustrates a passive plumbing connection. More specifically, FIG. 7 presents a configuration of dripper 308, drain 314, and growing tray 310 that supports passive insertion and removal of a growing tray 310 from a dock 320 to support automation. In FIG. 7, grow tray plumbing connection 702 is placed under dripper 308 with a tolerance defined by the size of grow tray plumbing connection 702. As long as some part of grow tray plumbing connection 702 sits under dripper 308 and over drain 314, growing tray 310 will remain "connected" to the plumbing system of dock 320. These limits can be defined as the right limit 706 and left limit 708 of grow tray plumbing connection 702. When growing tray 310 is moved such that grow tray plumbing connection 702 no longer sits between dripper 308 and drain 314, growing tray removal 710 is achieved and growing tray 310 is detached from plumbing. In some embodiments, to avoid splashing or spilling during insertion and removal, a flow rate limiter 704 is placed on each dripper 308 to ensure only a slow drip of nutrient water is flowing. Flow rate limiter 704 limits water flow through the use of a drip emitter, which allows for small, consistent amounts of water to flow out over time. This embodiment allows for automatic removal and insertion of growing trays 310 along with their associated plants into and out of plumbing and provides a foundation upon which plants can be moved in a growspace effectively in conjunction with plumbing systems.

Certain hydroponic grow methods (e.g. the membrane grow method) prefer low nutrient water flow rates. Traditionally, this is achieved with drip irrigation systems which use mechanical components called drip emitters to regulate water flow. These emitters can also be used as flow rate limiters 704 for controlling drip rates for automated insertion and removal of growing trays 310 from docks 320. While effective, flow rate limiters 704 are extremely prone to clogging as they provide a very narrow channel for water to flow through and any buildup of algae or other solid waste products can prevent water from reaching plants.

Thus, in some embodiments, flow rate limiters 704 can be replaced by a configuration of a system that actively adjusts dock circulation pump 312 via a dedicated computer controller. In such embodiments, this computer controller can run the dock circulation pump at a uniform cycle that gives short bursts of large flows of water, as opposed to small drips. This means that the volume of water moving into a growing tray via drippers 308 is large which removes and prevents clogs as compared to when using a drip emitter. A large opening allows any solids that have built up in the system to exit dripper 308 without clogging.

The embodiments presented above all maintain some plumbing at the dock level for recirculating water amongst growing trays 310. While much improved over growspace wide plumbing runs, there is still a requirement for pumps, plumbing, and power at each dock 320 for the system to function properly. Avoiding the equipment and complexity that comes from these localized plumbing systems further reduces the cost and maintenance requirements of a system.

Figure 8:
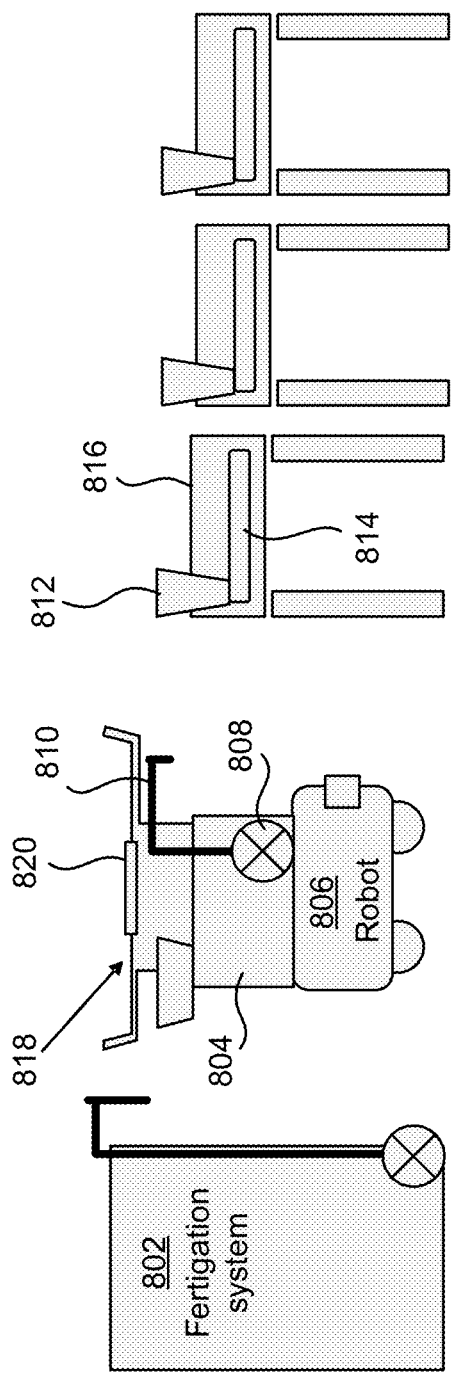
FIG. 8 illustrates an example of a plumbing system with self-contained growing trays, in accordance with embodiments of the present disclosure.

FIG. 8 presents a system configuration that removes traditional plumbing from the growspace entirely. In some embodiments, the mechanism to achieve plumbing removal is to modify each growing tray 820 such that it is completely self-contained. Each growing tray 816 is paired with a growing tray reservoir 814 that can be periodically filled by robot 806 and no outflow of water, aside from that taken up by plant roots or evaporation, occurs as the growing tray 816 has no drain. On demand nutrient mixes provided by the fertigation system 802 can then be transported to a growing tray reservoir 814 via robot 806. Fertigation system 802 creates a desired nutrient water mix, delivers it to robot reservoir 804 and robot 806 navigates to a desired growing tray 816.

In some embodiments, once robot 806 is at growing tray 816, it may be difficult to know how much water remains in growing tray reservoir 814 and to determine how much water should be given to it by robot pump 808. In some embodiments, using a water level sensor, as in FIGS. 5 and 6, would require sensors in every growing tray 816 along with battery or electrical power which is complex and cost prohibitive. Instead, to determine how much water is required, robot 806 uses robot lift 818 to lift growing tray 816 along with a weight sensor 820 to determine how much it weighs. Robot 806 measures the weight of growing tray 816 and associated growing tray reservoir 814 the first time it is filled and then measures it every subsequent time filling is desired to compute the amount of water needed.

Once the desired amount of water is known, robot pump 808 moves water from robot reservoir 804 through robot outflow 810 and into growing tray inflow 812 which flows down to growing tray reservoir 814 where it can be accessed by plant roots. This embodiment allows pipes to be completely removed from the growspace and saves on growspace cost and deployment complexity. It also allows for more modular and flexible placement of growing trays 816, as there is no longer a requirement for any fixed infrastructure like electricity or piping to be installed.

According to various embodiments, having exposed plumbing for automated grow tray removal, as shown in FIG. 7, allows for easy transport of growing trays by mobile robots, but can lead to problems with microorganism growth in plumbing connections (e.g. algae growth) that are exposed to light. In some embodiments, avoiding this growth is desirable as these microorganisms compete for nutrients with plants and can also become a vector for disease to spread.

Figure 9:
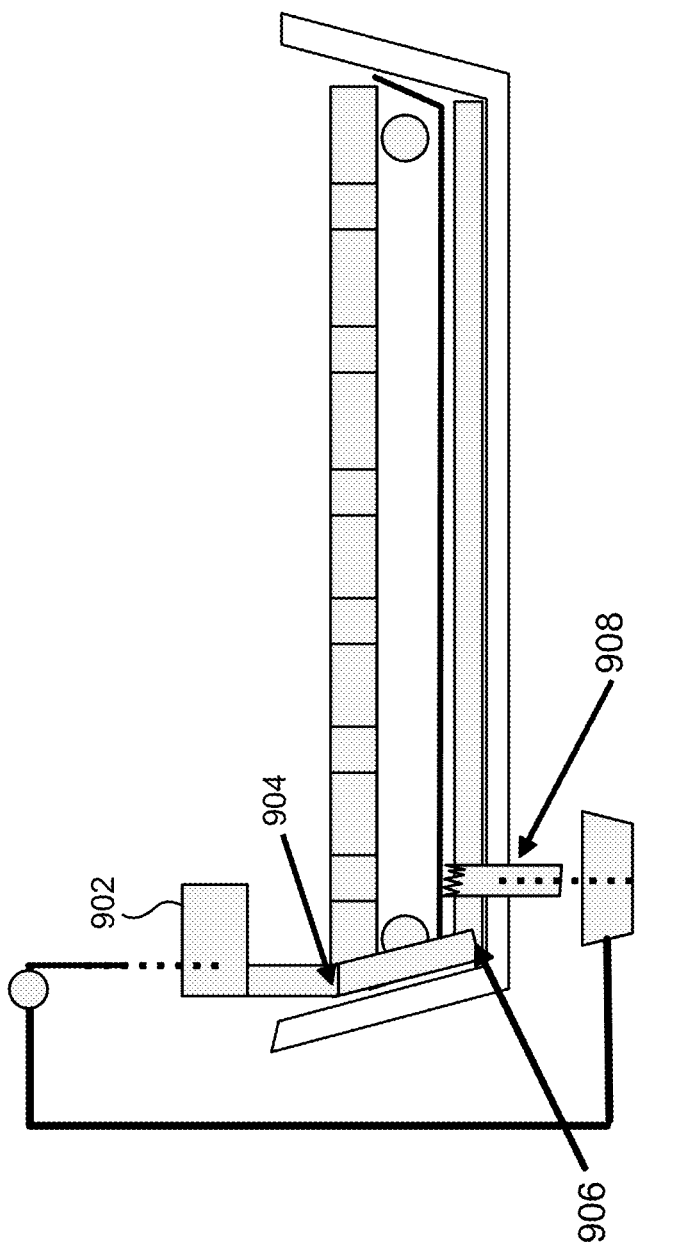
FIG. 9 illustrates an example of a plumbing system with light blocking, in accordance with embodiments of the present disclosure.

FIG. 9 presents a system configuration with plumbing designed to block light while still allowing growing trays to move in and out of plumbing in an automated fashion. Here nutrient water flows into a plumbing inflow 902 and down through inflow angle 904, which allows water to flow, but blocks light from entering. The nutrient water then moves out of inflow channel 906 into the growing tray and drains out vertical outflow channel 908 when the water in the growing tray reaches a desired height. Vertical outflow channel 908 is also blocked from light as it is below the growing tray. The combination of inflow angle 904 and vertical outflow channel 908 removes light from areas in the plumbing connections where water sits for any prolonged period of time. This greatly reduces any potential for microbial growth in the plumbing system, as light is not present as an energy source for them. This reduces microbial growth and results in cleaner systems that are more robust and less susceptible to contamination.

The example systems presented above all provide uniform flow rates to growing trays. However, in some embodiments, it can be desirable to actively control water flow into growing modules. For example, when removing a growing tray from plumbing with an automated system, it is desirable to turn plumbing off to avoid any splashing that might occur. It may also be desirable to provide water to a growing tray only at certain times of the day or in a non-uniform pattern (e.g. when trying to increase the sugar content of a plant via simulating drought conditions for a time).

In some embodiments, to achieve active duty cycle plumbing, a system can introduce a computer controller capable of controlling dock circulation pump 312. Specifically, the controller can turn dock circulation pump 312 on and off to allow insertion and removal of growing trays 310 without splashing. It can also do the same to provide low flow rates to growing trays 310 for the hydroponic methods that require them as mentioned above.

The system presented in FIG. 3 above requires that water be pumped from a main reservoir 302 to a dock reservoir 316 with supply pump 304 and dock circulation pump 312, respectively. These pumps require electrical power and are a potential point of failure in the system. In other words, if a pump fails, water is no longer sent to the plants. As such, in some embodiments, it may be desirable to avoid the need for pumps with a gravity based approach to water supply.

Figure 10:
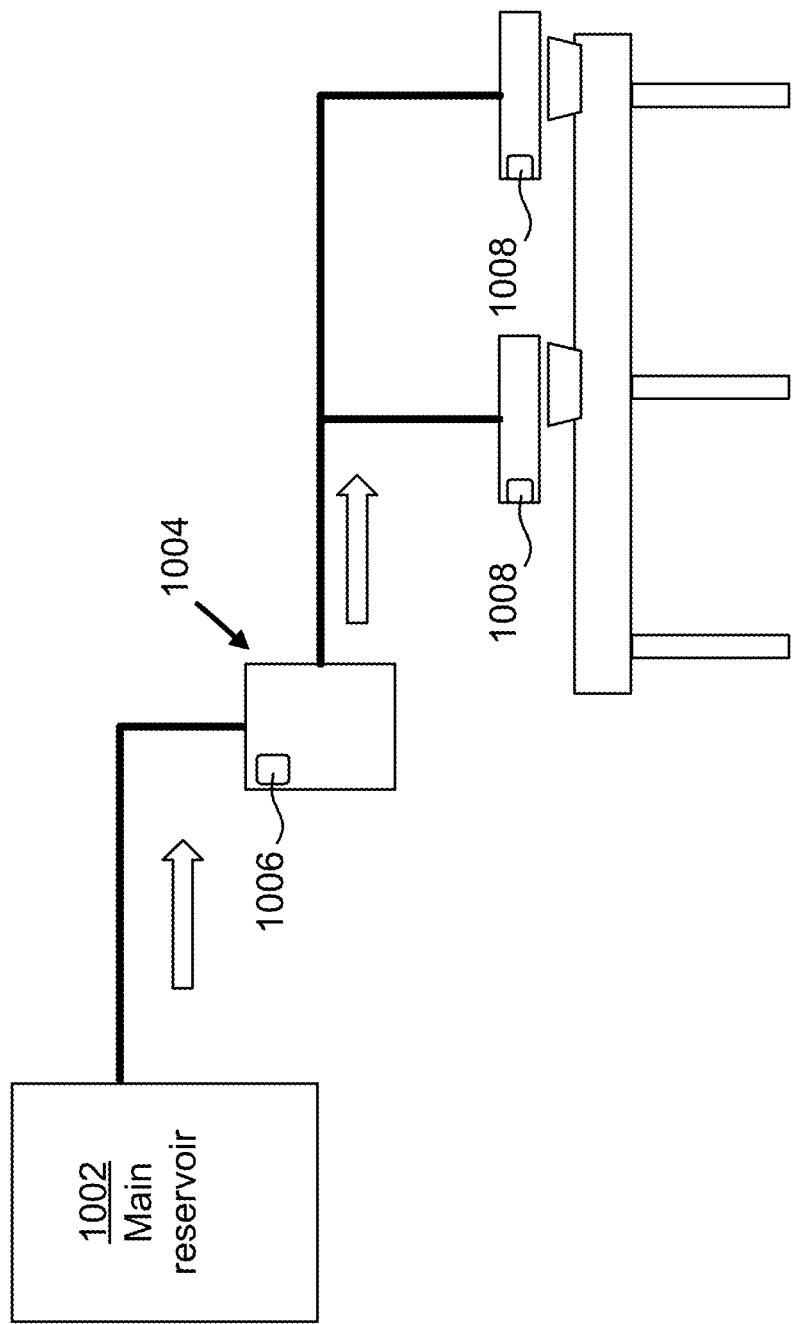
FIG. 10 illustrates an example of a plumbing system with gravity flow, in accordance with embodiments of the present disclosure.

FIG. 10 shows a configuration of a system that places a main reservoir 1002 above a dock reservoir 1004, which allows water to flow via gravity. Dock float valve 1006 allows water into dock reservoir 1004 when it falls below a desired level. From there, water flows via gravity from dock reservoir 1004 to the growing trays which are placed below dock reservoir 1004. The growing trays are also outfitted with growing tray float valves 1008, which measure the water level in the growing trays and allows water to flow in from dock reservoir 1004 when the water level is low enough to trigger growing tray float valve 1008. This system configuration avoids the need for pumps and associated electrical infrastructure throughout the growspace. It also provides a more reliable mechanism for moving water as pumps can fail. However, gravity flow is reliable even in the case of power loss.

Figure 11:
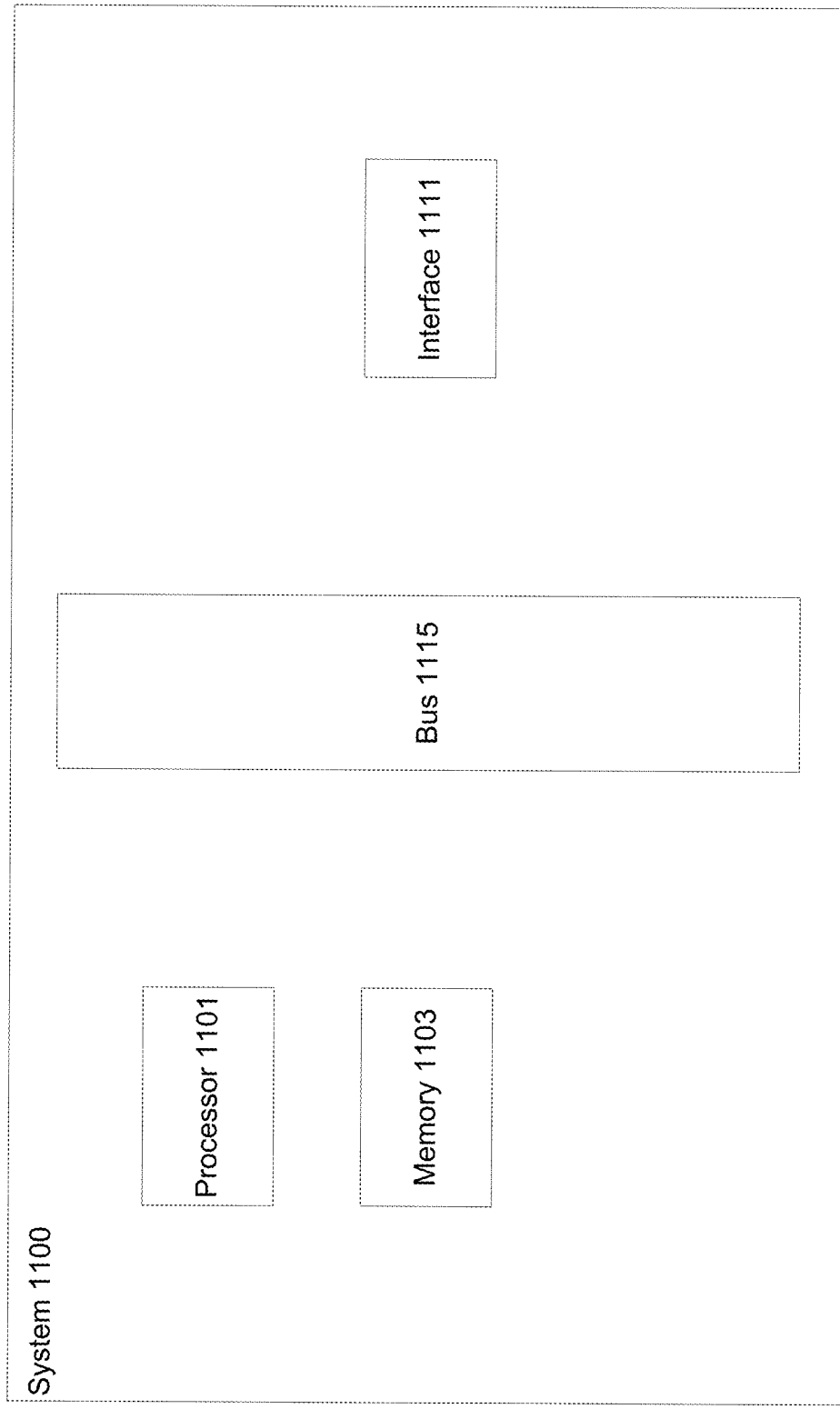
FIG. 11 illustrates one example of a computer system, in accordance with embodiments of the present disclosure.

The examples described above present various features that utilize a computer or a mobile robot, which utilizes a computer. FIG. 11 illustrates one example of a computer system, in accordance with embodiments of the present disclosure. According to particular embodiments, a system 1100 suitable for implementing particular embodiments of the present disclosure includes a processor 1101, a memory 1103, an interface 1111, and a bus 1115 (e.g., a PCI bus or other interconnection fabric). When acting under the control of appropriate software or firmware, the processor 1101 is responsible for implementing applications such as an operating system kernel, a containerized storage driver, and one or more applications. Various specially configured devices can also be used in place of a processor 1101 or in addition to processor 1101. The interface 1111 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1100 is a computer system configured to run a plumbing system, as shown herein. In some implementations, one or more of the computer components may be virtualized. For example, a physical server may be configured in a localized or cloud environment. The physical server may implement one or more virtual server environments in which the plumbing system is executed. Although a particular computer system is described, it should be recognized that a variety of alternative configurations are possible. For example, the modules may be implemented on another device connected to the computer system.

In the foregoing specification, the present disclosure has been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

What is claimed is:

1. A plumbing system, the system comprising:
a global water source within a grow space;
a one way water transport mechanism;
a growing tray that holds one or more plants; and
a local buffer configured to create a local water source whereby roots of the one or more plants of the growing tray take up water from the local buffer directly, wherein the local water source, being decoupled from the global water source, has a first flow rate that differs from a second flow rate of the global water source such that cross-contamination of water from the local water source and the global water source is prevented, wherein the local buffer automatically provides water from the global water source to the growing tray on demand without the need for filtering or dumping of used or excess water.

2. The system recited in claim 1, wherein the global water source includes a plurality of nutrient reservoirs, each nutrient reservoir capable of holding nutrient water with a unique composition.

3. The system recited in claim 1, wherein the global water source includes a fertigation system that creates nutrient mixes with a desired nutrient composition on demand.

4. The system recited in claim 1, wherein the growing tray includes a growing tray plumbing connection that can connect and disconnect with a corresponding dock without manual intervention or wasting water.

5. The system recited in claim 1, wherein the one way water transport mechanism includes a robot instead of plumbing pipes for transporting water from the global water source to the local water source.

6. The system recited in claim 1, wherein the growing tray is completely self-contained with no drain, the growing tray configured to receive water via robotic transport.

7. The system recited in claim 1, wherein a circulation controller controls a dock circulation pump to deliver water to the growing tray via short bursts of large flows of water to prevent clogging.

8. The system recited in claim 1, wherein the growing tray includes an inflow channel and an outflow channel both configured to be light-blocking in order to remove light from areas in plumbing connections where water sits for any prolonged period of time.

9. The system recited in claim 1, wherein a circulation controller controls a dock circulation pump to turn the circulation pump on or off.

10. The system recited in claim 1, wherein the global water source, one way water transport mechanism, and local buffer are configured such that water is delivered via gravity flow even in the event of a power loss.

11. A method of transporting water, the method comprising:
delivering water via a plumbing system, the plumbing system comprising:
a global water source within a grow space;
a one way water transport mechanism;
a growing tray that holds one or more plants; and
a local buffer configured to create a local water source whereby roots of the one or more plants of the growing tray take up water from the local buffer directly, wherein the local water source, being decoupled from the global water source, has a first flow rate that differs from a second flow rate of the global water source such that cross-contamination of water from the local water source and the global water source is prevented, wherein the local buffer automatically provides water from the global water source to the growing tray on demand without the need for filtering or dumping of used or excess water.

12. The method recited in claim 11, wherein the global water source includes a plurality of nutrient reservoirs, each nutrient reservoir capable of holding nutrient water with a unique composition.

13. The method recited in claim 11, wherein the global water source includes a fertigation system that creates nutrient mixes with a desired nutrient composition on demand.

14. The method recited in claim 11, wherein the growing tray includes a growing tray plumbing connection that can connect and disconnect with a corresponding dock without manual intervention or wasting water.

15. The method recited in claim 11, wherein the one way water transport mechanism includes a robot instead of plumbing pipes for transporting water from the global water source to the local water source.

16. The method recited in claim 11, wherein the growing tray is completely self-contained with no drain, the growing tray configured to receive water via robotic transport.

17. The method recited in claim 11, wherein a circulation controller controls a dock circulation pump to deliver water to the growing tray via short bursts of large flows of water to prevent clogging.

18. The method recited in claim 11, wherein the growing tray includes an inflow channel and an outflow channel both configured to be light-blocking in order to remove light from areas in plumbing connections where water sits for any prolonged period of time.

19. The method recited in claim 11, wherein a circulation controller controls a dock circulation pump to turn the circulation pump on or off.

20. The method recited in claim 11, wherein the global water source, one way water transport mechanism, and local buffer are configured such that water is delivered via gravity flow even in the event of a power loss.

* * * * *